United States Patent

[11] 3,589,270

[72] Inventors Gisbert Schlimme
 Braunschweig;
 Manfred Tschirner, Wolfenbuttel, both of,
 Germany
[21] Appl. No. 832,588
[22] Filed June 12, 1969
[45] Patented June 29, 1971
[73] Assignee Miag Muhlenbau Und Industrie GMBH
 Braunschweig, Germany
[32] Priority July 10, 1968
[33] Germany
[31] P 17 67 997.9

[54] DEVICE FOR PREPARING BREWING MALT
 10 Claims, 4 Drawing Figs.
[52] U.S. Cl. ............................................. 99/277.2
[51] Int. Cl. ............................................. C12g 3/00
[50] Field of Search ................................. 99/275-
 —278

[56] References Cited
 UNITED STATES PATENTS
 3,452,669 7/1969 Schaus ..................... 99/276
 FOREIGN PATENTS
 1,548,637 10/1968 France ..................... 99/276

Primary Examiner—Richard J. Scanlan, Jr.
Assistant Examiner—George H. Krizmanich
Attorney—Singer, Stern and Carlberg ABSTRACT: A single apparatus for preparing brewing malt in three steps, namely steeping, germinating and drying. A horizontal rotary annular perforated rack arranged in a cylindrical trough is charged with the material to be treated and while placed on the rotating rack is firstly steeped in water introduced into the trough below the rack. After the water has been discharged, the germinating step is performed by introducing air conveyed by a fan into the space between the rack and the bottom of the trough and upwardly through the material, which latter is turned by a horizontal series of vertically arranged turning worms which as a unit may be horizontally moved into the material on the rotating rack, the unit of worms being vertically movable into the layer of material and again outwardly therefrom.

During the final drying step, the same fan is used to circulate heated air through the material on the rotating rack, and the dried material then discharged from the rack by a conveyor which may be lowered into the material on the rack. The material is then discharged into a worm conveyor leading to a discharge pipe. As conveyor may serve an endless conveyor with buckets which scoop the material from the rack.

INVENTORS:
Gisbert SCHLIMME
Manfred TSCHIRNER

By Singer, Stern & Carlberg
Attorneys

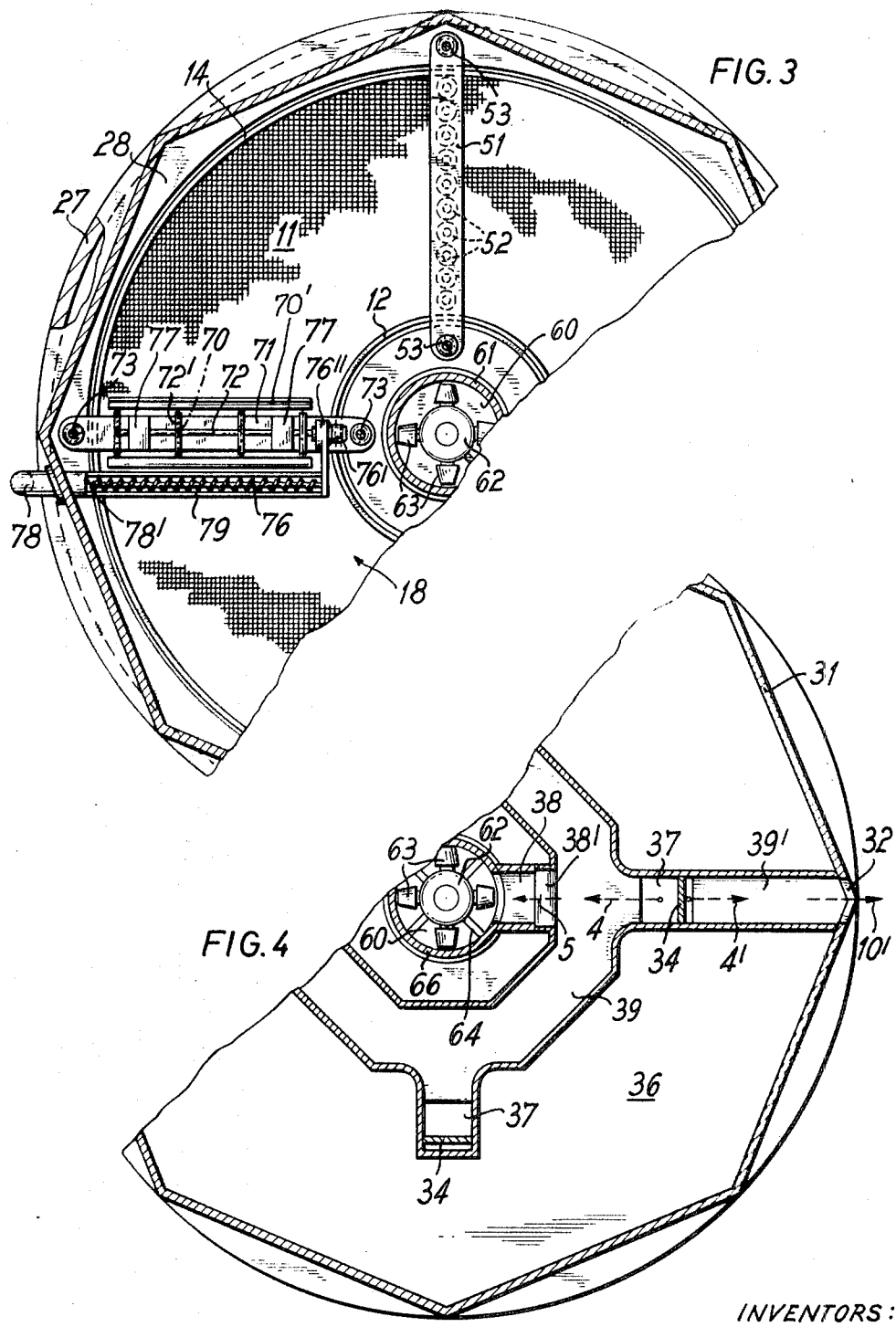

DEVICE FOR PREPARING BREWING MALT

This invention relates to an apparatus for preparing brewing malt on a rotatable annular rack structure.

It is an object of the invention to provide a device which permits of performing the three main steps of malt preparation, i.e., steeping, germinating and drying in one single apparatus, including the possibility of full electric control, and also automatic operation without any manual work.

Conventional annular racks are placed in a square building, the wedge-shaped areas formed in the corners thereof between the rotary rack and the building being utilized to place therein channels for warm and cold air, and this is done for the particular purpose of arranging several shelves or racks above one another. Among the disadvantages of such an arrangement are the necessity for carrying out the steeping operation independently, for carrying out the removal operation manually or with special means, and the stationary arrangement of the turning device, which makes the operations of loading and unloading difficult.

This invention overcomes the mentioned disadvantages by providing a rack drying apparatus with an arrangement in a watertight cylindrical trough having an outer wall and a concentric shaft structure which is provided in its lower portion with apertures and containing an axial fan, the lower portion of the shaft structure being capable of communicating with a space between the rack and the bottom of the trough, the upper portion of the shaft structure being capable of communicating with channels disposed in a roof structure containing a heater and a cooler, the channels being partly closable and having adjustable apertures for fresh air and exhaust air and being connected by changeover valves with the space above the racks, in which vertically movable turners and removers are stationarily disposed.

In an apparatus of such a construction, the annular rack structure disposed in the trough can be put under water for the purpose of steeping seals between the rack and the trough insuring that as little water as possible is used; the space between rack and the trough is available for mechanical, not watertight devices; and the time periods for filling and discharging are kept as short as possible. The rack can be charged without any trouble, and the charge deposited thereon can be turned and removed according to regulation, whereby the devices for these operations are liftable above the level of the drying material. The annular rack structure is placed around a shaft structure in which a fan for air circulation is arranged. The lower part of the shaft structure leads to the lower rack space and the upper part to air conducting channels which permit the discharge of air from the upper rack space for any desired purpose, i.e. for air recirculation, for drying operation and for cool air circulation, whereby, according to requirement and desire, fresh air can be introduced and spent air can be exhausted. The arrangement of the noted channels, heat-exchanger and openings in the roof with a top structure thereon insures a simple apparatus readily manipulatable and capable of meeting all requirements for the preparation of malt.

An embodiment of the invention and additional features of the same will now be explained in the following description with reference to the FIGS. of the accompanying drawings, in which:

FIG. 3 is a partial horizontal sectional view along the line III-III of FIGS. 1 and 2, and FIG. 4 is a partial horizontal sectional view along the line IV-IV of FIG. 1.

Figure 1:
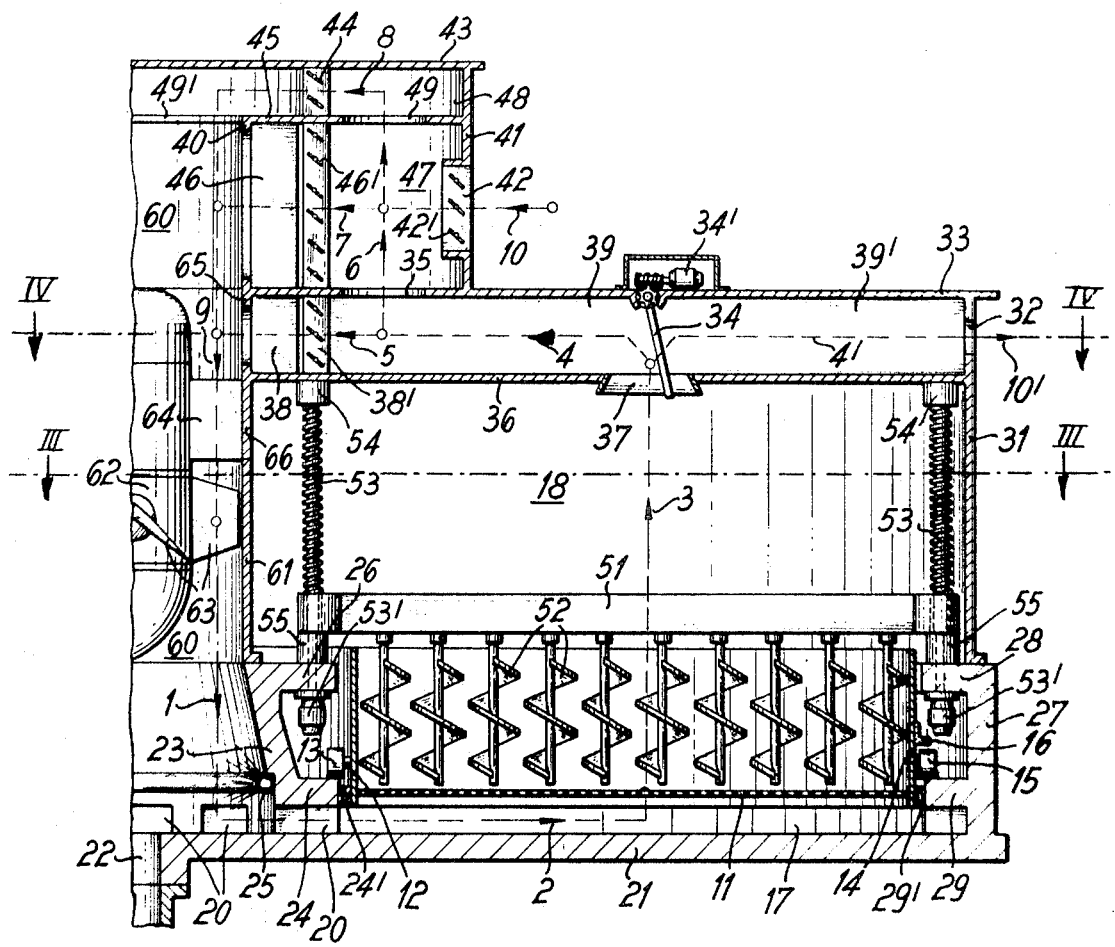
FIG. 1 illustrates the right-hand half of an axial section of an apparatus according to the invention, including air channel turners and changeover valve.

Referring to the drawings the annular rack includes a horizontal perforated floor plate 11 from which extend an inner wall 12 and an outer wall 14 upwardly. Both walls have rollers 13 and 15 mounted thereon. The outer wall 14 carries an outer spur gear or a set of pins 16 for driving the rack by one or several motors 19.

The annular rack is disposed in a stationary trough having a bottom 21, a vertical outer cylindrical wall 27 and an inner concentrically disposed collar 23, having a truncated cone-shaped inner space which communicates with the space 17 between the floor plate 11 and the bottom 21 of the trough by means of radial passages 20. At the inner wall of the collar 23 is arranged a device 25 for humidifying the air which is to be blown into the space 17 below the floor plate 11. The concentric collar 23 has, at its lower end an outwardly extending flange 24 upon which run the inner track wheels 13 of the rack, and at its upper end the collar 23 has a flange 26 also extending outwardly and on the lower side of which are disposed motors 53' employed for vertically moving the turners and also the motors 73' for vertically moving the remover 71. On the flange 26 are disposed the lower bearings 55 and 75 for the inner vertical screw spindles 53 and 73 on which the inner ends of turner 51 and remover 71 respectively are guided. Vertically spaced flanges 28 and 29 extending inwardly from the trough wall 27 correspond to the flanges 26 and 24 on the collar 23. The rollers 15 on the outer rack wall 14 run on the lower flange 29. The upper flange 28 has disposed thereon the lower bearings 55 and 75 for the screw spindles 53 and 73 for the outer ends of turner 51 and remover 71, respectively. Below the flange 28 are disposed the drive motors 53' for the outer spindles of the turner and the motors (not shown) for driving the outer spindles of the remover as well as motors 19 for driving the rack.

The wall 61 of the hollow shaft is supported by the upper end of the central collar 23. The upper end of the trough wall 27 carries the wall 31 defining the outer limit of the upper rack space 18. Between the inner wall 12 and the lower collar flange 24 is arranged a seal 24', which can be elastically deformed by a pressure means and pressed against the two mentioned parts in order to seal the rack space against the adjacent spaces. A corresponding seal 29' is disposed between the outer vertical wall 14 and the lower flange 29 of the trough wall 27. The horizontal bottom wall 21 of the trough has a central aperture 22 for charging and discharging the water filling.

Figure 2:
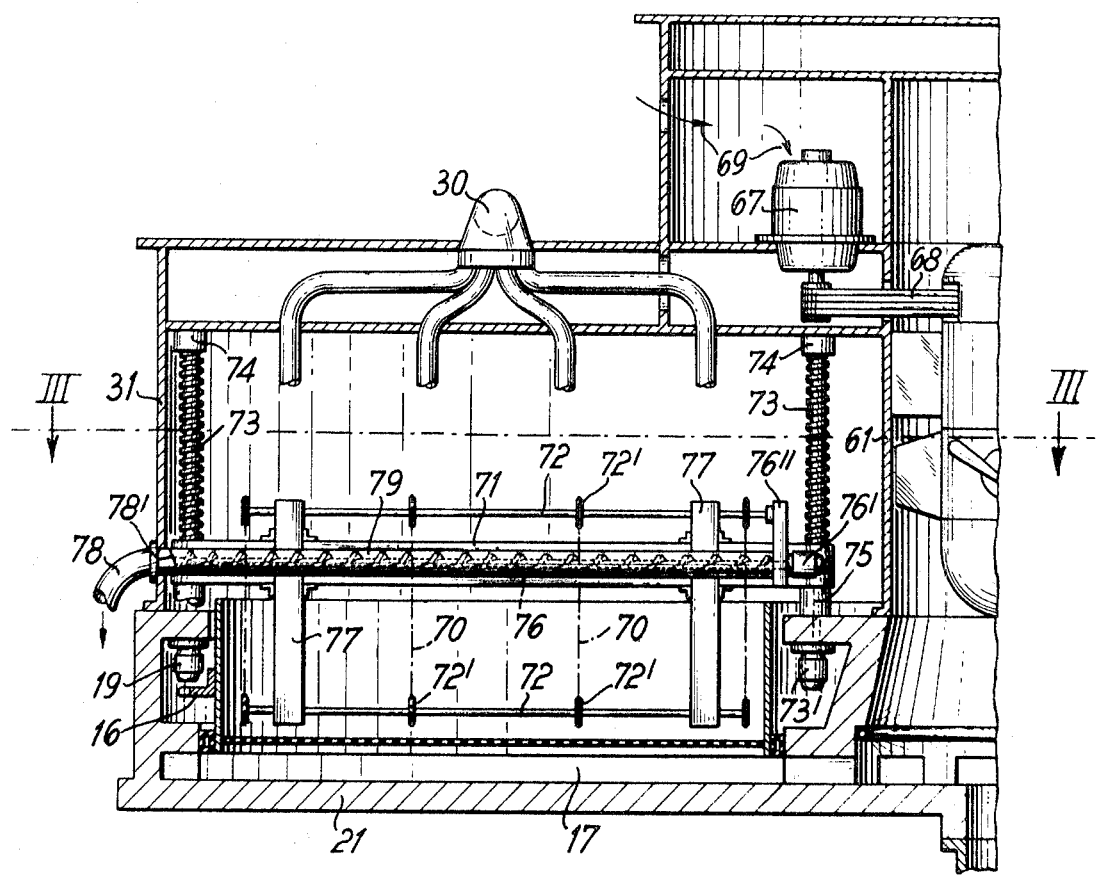
FIG. 2 illustrates the left-hand half of an axial section of an apparatus according to FIG. 1 and shows a fan motor, remover, track drive and charging device.

The shaft 60 extending upwardly from the inner space of the collar 23 comprises a vertical cylindrical shaft wall 61, a vertical ring 66 which carries guide vanes 64 and a fan 62, a vertical roof shaft wall 65 as well as a vertical shaft wall 40 of the top structure. The fan 62 has adjustable blades 63 and is driven by a motor 67 over belts 68. The motor 67 is disposed outside the shaft 61 in order not to be exposed to heat and humidity in the shaft 61. The motor 67 is aerated and cooled by outside air flowing in the direction of the arrows 69 (FIG. 2). The shaft 60 and/or collar 23 may be so designed in a conical shape that they act as diffuser for the fan 62, 63.

The wall 31 defining the space 18 above the rack and the shaft walls 66 and 65 supports the lower horizontal bottom wall 36 and the upper bottom wall 33 of the roof. The lower bottom wall 36 is provided with an aperture 37 controlled by a changeover valve 34. Between the upper bottom wall 33 and the lower bottom wall 36 are formed the horizontal channels 39 and 39', which are separated from one another by the changeover valve 34. While the channel 39 is annular, the channel 39' starting from the annular channel 39 extends radially outwardly. (FIG. 4) The outer end of the channel 39' communicates with the outside air by means of an opening 32. The inner wall of the channel 39 is in communication with the shaft space 60 by a heater 38 in front of which is arranged a lamellar valve 38'. The lower bottom wall 36 carries also the upper bearings 54 and 74 for the screw spindles 53 and 73 of the turner and the remover respectively. The upper wall 33 carries the bearing for the changeover valve 34 which is designed as a simple flap operated by a drive 34'. Furthermore, an opening 35 is arranged in in the wall 33 which communicates with the top structure. This top structure is defined by the vertical outer wall 41 which is provided with an intake opening 42 for fresh air and which supports an horizontal top wall 43 and a horizontal wall 45 therebelow. Both walls 43 and 45 form between the same an air circulation channel 48, which can be closed by a lamellar valve 44. The lower wall 45 has an opening 49 leading to a channel 47 of the top structure, while an opening 49' leads to the central shaft space 60. The channel 47 contains the cooler 46 in front of which is arranged the lamellar valve 46'. The lamellar valves 38', 46' and 44 may be individually closed and opened and adjusted to positions therebetween in order to adjust the air coming from the channel 39 concerning its temperature.

The turner (FIG. 1) comprises a horizontal main beam 51 on which a number of vertically disposed and horizontally spaced turning worms 52 are arranged. The ends of the main beam are connected with the vertical spindles 53, the lower ends of which are journaled in bearings 55, and then extend through the flanges 26 or 28 of the collar 23 and the wall 27 respectively and are connected with the drive motors 53'.

The remover (FIG. 2) comprises a horizontal main beam 71, the two ends of which are connected to the spindles 73, and carry a frame structure 77 in which vertically spaced horizontal shafts 72 with sprocket wheels 72' are journaled. Endless carriers, such as chains 70 extend between each pair of sprocket wheels 72' disposed above one another. Elevator buckets 70' are attached to each endless chain 70. The elevator buckets 70' are operated in such manner that when moving around the upper sprocket wheels 72', the contents of the buckets are discharged into a horizontal trough 79 disposed parallel to the main beam 71 of the remover, The trough 79 contains conveyor worm 76 which is driven by the motor 76' and a gearing 76" which also drives the upper shaft 72 of the bucket conveyors. The left end of the trough 79 containing the conveyors worm 76 extends into the discharge pipe 78, forming with the latter an inclined joint 78' in such a manner that the remover can be moved vertically, upwardly, but forms a practically tight seal with the discharge pipe 78 in its lowermost position. The connection of the main beam 71 with the vertical spindles 73 supported in the upper bearing 74 and the lower bearings 75 respectively as well as the drive motors 73' for the vertical movement is the same as described in connection with the turner arrangement.

The charging of the rack is effected by a charging device 30 hydraulically when the turner 51 and the remover 71 are in the raised position. The rack structure 11 to 16 is driven during the charging period with high speed. Uneven spots in the surface of the introduced material can be eliminated by an appropriate lowering of the remover 71, whereby one of the elevator buckets 70' acts as a grader blade. For steeping water is introduced through the lower aperture 22 and into the trough, this being carried out up to the level of the surface of the upper flanges 26 and 28 (FIG. 1). Prior thereto the seals 24' and 29' are expanded in order to prevent the water from rising in the outer spaces between the rack and the trough or collar, respectively.

Upon completion of the steeping operation, the water is withdrawn again through the aperture 22, and the germinating step begins. For this purpose, the fan 62, 63 is put in operation. The fan conveys air in the direction of arrows 1, 2 into the space 17 below the rack 11, 12, 14. During the movement of the air it may be humidified by the device 25. The air penetrates the perforated floor plate 11 and the material deposited thereon in the direction of upwardly pointing arrow 3 and passes through the aperture 37 into the channel 39. The air then flows horizontally inwardly in the direction of the arrow 4, subsequently, however, is again deflected upwardly as shown by the arrow 6 and through the aperture 35, because the lamellar valve 38' of the heater 38 is closed. In channel 47 the airstream is deflected in the direction of the arrow 7 toward the left, because the lamellar valve 42' in the fresh air intake 42 is closed. The lamellar valve 44 in the recirculation channel 48 is also closed. Therefore, the air passes through the open lamellar valve 46' into the cooler 46 and from there into the shaft space 60, where the described circuit is closed as indicated by the arrow 9. The turning of the material required during the germinating process may be performed in a conventional manner, but in accordance with the invention the turner 51 is lowered into the material, and the turning worms 52 are moved through the material while the rack 11, 12, 14 is slowly rotated. The drive for rotating the worms 52 about their own axes is not shown, but it may be constructed in a manner similar to the drive of the remover.

After the completion of the germinating step, the material is dried. For this purpose the fan 62, 63 conveys hot air in a manner previously described up to the channel 39, with the difference however, that now, the air is conducted in the direction of the arrows 4, 5 through the heater 38 while the lamellar valve 38' is open, and the lamellar valves 46', 44, 42' are maintained closed. The changeover valve 34 is adjusted to engage the right side of the aperture 37 during purely recirculated air operation. If, however, some fresh air is to be added continuously and some spent air is to be removed, then the lamellar valve 42' for fresh air has to be slightly open and the changeover valve 34 correspondingly adjusted somewhat away from its right side engaging position. In this situation, fresh air can enter in the direction of the arrow 10, while spent air can be removed in a corresponding measure through the channel 39' in the direction of the arrows 4' and 10' through the exhaust aperture 32. It is important particularly for the germinating step to prevent any air from flowing through the heater 38 or through cooler 46. In order to establish sole recirculation of air the lamellar valves 38' and 46' have to be closed, but the lamellar valve 44 must be open. Air can then recirculate in the direction of the arrow 8 while fresh air can be added and spent air removed in the manner described. To adjust the capacity of the fan for the best possible result, it is provided with adjustable blades 63 which can be adjusted by a built-in motor which is not shown.

After completion of the drying step, the remover 71 is lowered slowly into the germinating material while the rack structure 11, 12, 14 is rotating at a moderate speed, whereby the elevator buckets transport the material into the trough 79 which removes the material in the manner already described.

If it is deemed necessary to separate the operations of the vertical spindles 53 and 73 and to move them also vertically, it would be possible to install smooth guide posts in lieu of the screw spindles 53 and 73 and to arrange the spindle drives separately. In this case, the drive motors 53' and 73' may be arranged in the free space between the upper wall 33 and the lower wall 36 of the roof. In lieu of changeover valve 34, a slide valve may be used, or a rotary slide valve with vertical axis or any other appropriate device.

The remover 71 (FIG. 2) may also be equipped with other vertical conveyors in place of the bucket elevators, for instance, with worms. Also a device employing direct pneumatic suction is conceivable. However, an elevator operates very carefully and clears the rack completely without leaving any residue. In case difficulties arise because of the length of the elevator spans, they may be shortened and the material may be conveyed by a horizontal worm operating directly over horizontal bottom 11 of the rack. Such a conveyor worm may be designed as a twin screw with opposing conveyor directions.

The use of a short elevator results in a shortening of the discharge worm 79, whose trough may be stationary, so that a joint line 78' is not required.

It is advantageous to make the horizontal cross section of the perimeter of the trough wall 27, as well as that of the perimeter of the wall 31 of the upper rack space 18 of a polygonal shape, particularly of an octagonal configuration. This makes the manufacturing of the trough wall easier, particularly that of the wall 31 and the horizontal walls 33 and 36 supported thereby. Obviously, insulations are provided, particularly for the wall 31.

The described malting apparatus is particularly suitable for carrying out the well-known resteeping method for the steeping step, because relatively little water is used. The temperature conditions are readily controllable because of low heating values of the walls, and the ratio of air space above the rack to the rack space is small and therefore is favorable to the temperature conditions.

As a particular example of the method which may be performed with the apparatus of the invention may be mentioned that the steeping operation requires about 2 days, whereby the temperature of the material is about 14° to 18° C. The germination following this steeping operation requires about 7 days at temperatures between 16° and 20° C. The final drying operation requires about 36 hours at temperatures between 50° and 90° C.

What we claim is:

1. An apparatus for preparing brewing malt comprising a stationary trough, a rotatable annular rack structure in said trough, said trough being provided with a centrally arranged hollow shaft structure and an outer wall concentrically arranged to said shaft structure, the bottom of the rack and the bottom of the trough defining a space therebetween, the lower portion of said hollow shaft structure communicating with the space between the bottom of said rack structure and the bottom of the trough, an axial fan in said shaft structure, a roof structure, a horizontal upper wall and a horizontal lower wall spaced from said upper wall defining said roof structure, said roof structure attached to said trough, interconnected channels disposed between said upper and lower walls of said roof structure and in communication with the upper portion of said shaft structure, a heater in one and a cooler in another one of said channels, and a further one of said channels leading to the atmosphere, adjustable valves for controlling the intake and the exhaust of air in and from said channels, a changeover valve for connecting the space formed above said rack structure between the latter and said lower wall of said roof structure with said channels, and vertically movable turner and remover devices arranged in said rack structure and supported by said trough.

2. An apparatus according to claim 1, in which said lower horizontal wall of said roof structure is provided with an aperture and that said changeover valve comprises a swiveling flap arranged above said aperture and between said channels, said flap connecting in its end positions said space formed above said rack and below said lower wall selectively with the atmospheric air and with said valves, and means forming a recirculating channel for said cooler and heater, respectively.

3. An apparatus according to claim 1, including seals arranged between said rack structure and said shaft structure and between said rack structure and said outer wall, said seals being of the deformable type.

4. An apparatus according to claim 1, including a humidifier arranged in the lower portion of said shaft structure for humidifying the air conveyed by said fan to the space below said rack structure.

5. An apparatus according to claim 1, including a drive motor for said axial fan, said drive motor being disposed adjacent and on the exterior of said shaft structure, and means for drivingly connecting said motor with said fan.

6. An apparatus according to claim 1, in which said remover comprises an elevator having buckets for discharging material from said rack structure, said trough including a conveyor therein for receiving discharged material and a discharge pipe connected to said conveyor.

7. An apparatus according to claim 1, wherein the lower portion of the shaft structure has a hollow frustoconical shape diverging downwardly.

8. An apparatus according to claim 1, wherein said outer wall of said trough has a cross section of a polygonal configuration.

9. An apparatus according to claim 1, wherein threaded spindles are provided as means for vertically moving said turners and remover devices.

10. An apparatus according to claim 1, in which said changeover valve comprises a motor operated pivoted flap, an aperture formed in said horizontal lower wall, said pivoted flap selectively opening said aperture to either of the channels.